April 14, 1970     R. GOTTSCHALD     3,506,288
BALL JOINTS
Filed Nov. 25, 1966
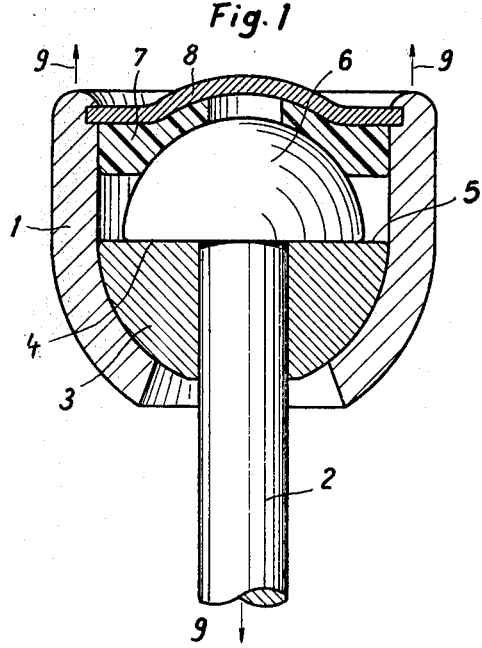
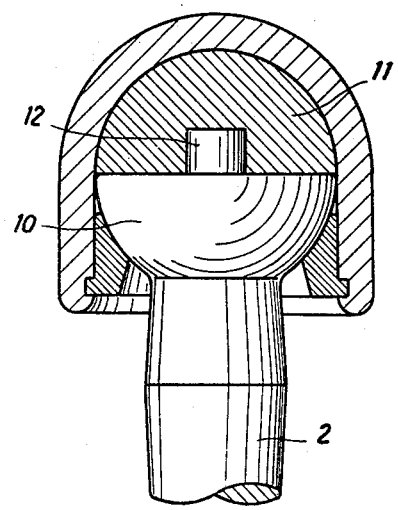
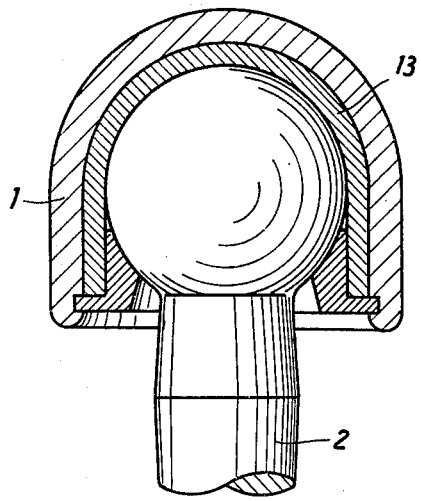
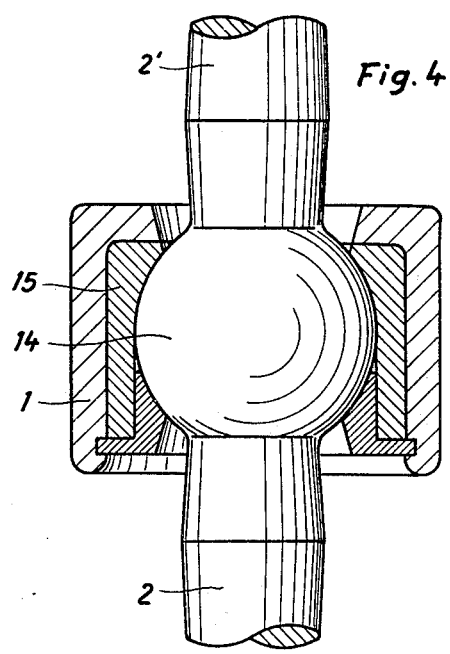
Inventor
Rudolf Gottschald
Arthur Schwartz
ATTORNEY

United States Patent Office 3,506,288
Patented Apr. 14, 1970

3,506,288
BALL JOINTS
Rudolf Gottschald, Osterath, am Meerbusch, Germany, assignor to A. Ehrenreich & Cie., Dusseldorf-Oberkassel, Germany
Filed Nov. 25, 1966, Ser. No. 596,876
Claims priority, application Germany, Nov. 27, 1965, E 30,545
Int. Cl. F16c 7/00, 11/06
U.S. Cl. 287—87                                3 Claims

ABSTRACT OF THE DISCLOSURE

A ball and socket joint having a universally movable ball member, a portion of said device being made cast iron, spherolite cast iron, aluminum or aluminum bronze, and preferably made by the lost wax process.

BACKGROUND AND OBJECTS

My invention relates to a ball joint and more particularly to a ball joint as it is used with guides and steering gear as well as wheel suspension, preferably in motor vehicles, said ball joint comprising a joint case or housing and a joint pin being supported in the joint case via a ball body so that it will be universally movable.

As a rule, the ball body of ball joints of the type as described above which are already known are made from steel. Manufacture of these ball bodies is comparatively expensive. Subsequent processing and subsequent treatment of the same will be required, especially if they are to be used with joints intended to be subject to major loads and in which steel surfaces are gliding on other steel surfaces.

Ball joints having a ball body receiving the loads and consisting of fiber material soaked with plastic or synthetic resin will not be suited to receive major loads.

The principal object of the present invention is to provide a ball joint of the type as described above comprising a bearing body which may be produced in a simple and inexpensive manner and which may be designed for major and maximum loads and which, in addition, permits the manufacture of pieces which do not require any subsequent processing as well as of pieces which do not need to be subsequently treated either.

According to the present invention the above problem has been solved by providing, for bearing purposes, a cast metal body and more particularly a body consisting of gray cast iron, lost wax casting or aluminium.

It is possible to employ the lost wax process with cast iron in such a way that any subsequent processing will not be required after casting which processing necessitates great accuracy and is therefore comparatively expensive. In addition, cast iron is especially favorable in that it may have, apart from good mechanical strength properties, also good antifrictional qualities. In any particular case the bearing body which has been produced in a lost wax process may be subsequently hardened or case hardened.

Aluminium which may also be subject to the lost wax process may be dispersion hardened after casting. The same applies to aluminium bronzes which are known for their durability together with a remarkable mechanical strength and great resistance to wear.

SUMMARY

In a preferred embodiment according to the present invention the bearing body has been produced from spherolite cast iron which may also be subject to the lost wax process. Spherolite cast iron may have strength values similar to those of moderately hard steel. The presence of nodules in the surface will be responsible for favorable gliding properties of the bearing body which qualities are of special importance with ball joints in motor vehicles even as high stress anti-frictional qualities. Apart from that, spherolite cast iron bearing bodies are highly resistant to wear.

The bearing bodies may be subject to hardening in the course of subsequent treatment such as induction hardening in order to improve their hardness.

It will also be possible to add to the melt prior to casting in a manner already known chromium, magnesium or molybdenum to be followed by silicon injection. Subsequent to casting the surface may be hardened by quenching.

The drawing shows various examples of construction according to the present invention.

FIG. 1 is a vertical section of a joint under tension.

FIG. 2 is a vertical section of a ball joint in bearing position in which the ball head at the joint pin consists of two parts.

FIG. 3 is a vertical section of a ball joint comprising a bearing bush which consists of a cast body.

FIG. 4 is a vertical section of another embodiment according to the present invention.

The ball joint comprises the joint case 1 and the joint pin 2 said joint pin being supported in the joint case via the ball body 3 in the form of a spherical segment so that it will be universally movable. The joint pin has been inserted through the spherical segment 3 and may turn within the latter. It is supported by a shoulder 4 on the flat surface 5 of the spherical segment. The shoulder 4 is the bottom face of the pin head 6 which has a spherical surface. A cup 7 or an intermediate layer of caoutchouc elastic material such as interlaced polyurethane is contacting the spherical surface of the pin head. The case will be closed by the rolled in cover 8 pressing the cup 7 against the pin head.

The direction of the joint load has been indicated by the arrows 9.

According to the present invention the spherical segment 3 is a cast metal body or a body produced in a lost wax process. In the preferred embodiment shown the spherical segment consists of spherolite cast iron which has been subject to the lost wax process.

In the ball joint as shown in FIG. 2 the joint pin has a spherical segment 10 which, due to another spherical segment 11 on top of the same, becomes a ball. The flat face of the segment 10 has a projecting pin 12 engaging with a corresponding hole of the segment 11. The spherical segment 11 is a cast body or a body produced in a lost wax process respectively, especially made from spherolite cast iron or aluminium or aluminium bronze.

The ball joint according to FIG. 3 has been provided with a bearing bush 13 consisting of a cast metal body;

FIG. 4 shows a ball joint for connection on either side; for this end the ball body 14 has two joint pins 2, 2'. The ball body is supported in the bush 15 which consists of a cast metal body.

The present invention permits still other embodiments. According to the present invention it will be essential that at least one of the cooperating bearing surfaces within the joint case is a cast metal body.

I claim:
1. A ball joint comprising:
  (a) a housing,
  (b) a joint pin extending from one end of said housing,
  (c) a head member in said housing attached to said joint pin,

(d) a cast aluminum bearing member in contact with said head member, said bearing member having on its periphery the final impression of a hardened lost wax casting so as to present exposed surface nodules within the required tolerance limits without the necessity of subsequent surface finishing.

2. A ball joint as defined in claim 1 wherein said head member and said bearing members are substantially hemispherical, each having flat surfaces in contact with each other.

3. A ball joint as defined in claim 1 wherein said head member is substantially spherical and said bearing member surrounds a substantial portion of said head member.

References Cited

UNITED STATES PATENTS

| | | |
|---|---|---|
| 1,844,101 | 2/1932 | Niven _____ 287—87 |
| 1,881,601 | 10/1932 | Hufferd et al. |
| 1,900,617 | 3/1933 | Ricardo _____ 308—237 |
| 2,823,055 | 2/1958 | Booth. |
| 2,890,915 | 6/1959 | Benham _____ 308—237 XR |
| 3,262,706 | 7/1966 | Hassan. |
| 3,329,472 | 7/1967 | Donnellan et al. |

DAVID J. WILLIAMOWSKY, Primary Examiner

A. KUNDRAT, Assistant Examiner